March 6, 1928.
E. C. SASNETT
1,661,507
RAILWAY SIGNALING
Filed Sept. 24, 1925
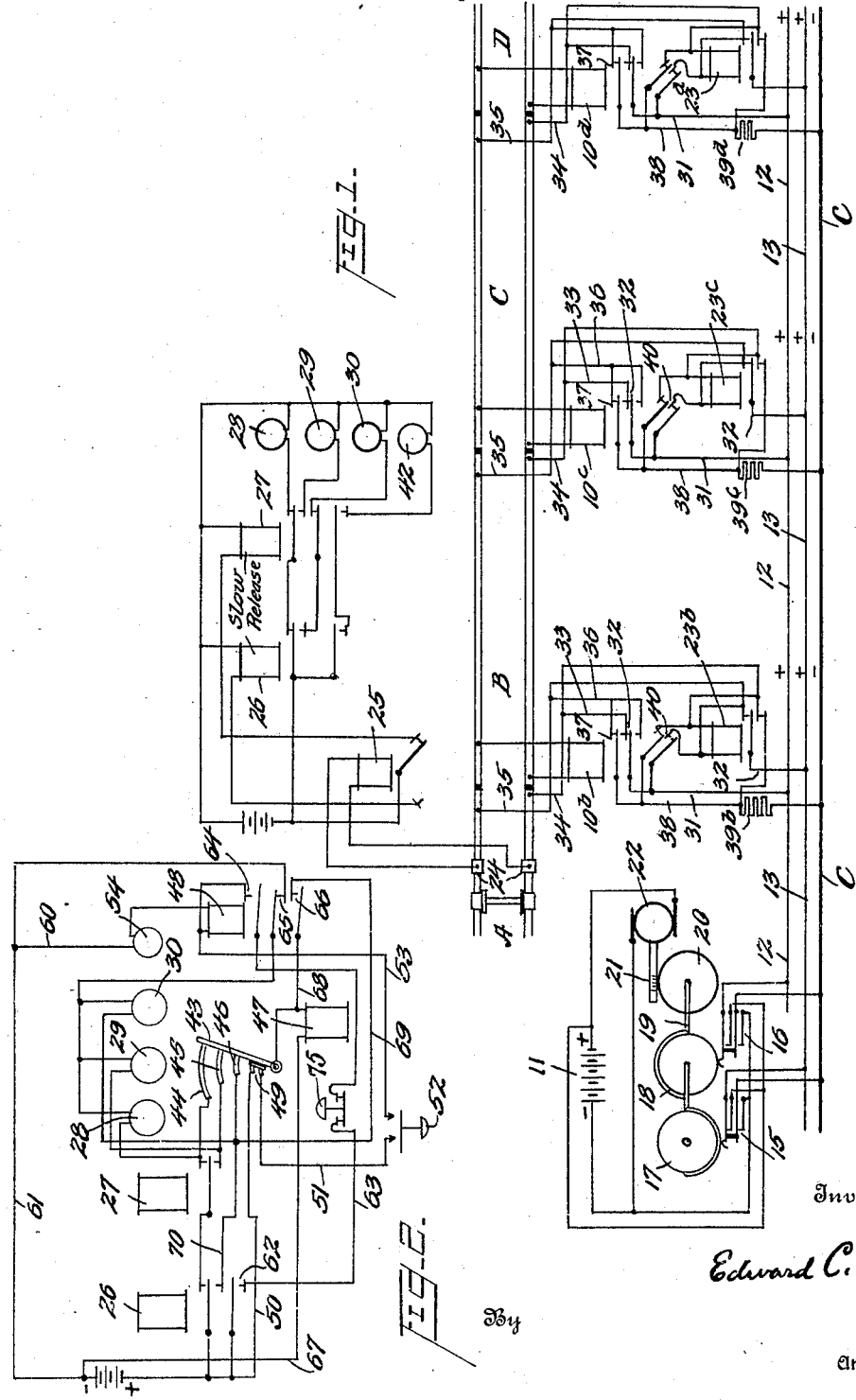
Inventor
Edward C. Sasnett
By
Attorney Patented Mar. 6, 1928.

1,661,507

UNITED STATES PATENT OFFICE.

EDWARD C. SASNETT, OF WASHINGTON, DISTRICT OF COLUMBIA.

RAILWAY SIGNALING.

Application filed September 24, 1925. Serial No. 58,447.

The present invention relates to railway signaling and particularly to continuous indication systems of signaling and automatic train control.

The novel features of the invention will be pointed out by the claims.

Referring to the accompanying drawing:

Fig. 1 illustrates, diagrammatically, one embodiment of the invention, and Fig. 2 is a diagrammatic illustration of certain permissive speed control features.

The invention is directed to a speed controlled permissive system located on the vehicle or on the cab of a locomotive, whereby the engineer can proceed without speed restriction after receiving a danger signal, provided he slows down the train to or below a predetermined speed and performs a conscious act to insure his alertness to the situation. It is to be understood therefore that the track system illustrated forms no part of the invention and that the invention can be applied to any continuous indication system.

The track is divided into insulated blocks A, B, C, D etc., and a track relay $10^b$, $10^c$, $10^d$ etc. is connected across the rails at the entrance end of each block.

As illustrated, the track relays are energized from a source of continuous current 11, such as a battery, located at a central station. The battery is adapted to be connected alternately to two line wires 12 and 13, a common return wire C being provided. For this purpose means are provided, such as switches 15 and 16 operated respectively by cams 17 and 18. These cams are fixed on a shaft 19, which also has fixed thereto a worm wheel 20 driven by a worm 21 rigid with the armature of a motor 22.

The cams 17 and 18 each extend through an arc of 180° and are displaced 180°, so that during each revolution of shaft 19, switch 15 is held closed for a certain length of time, connecting battery 11 across wires 13 and C, and then is opened simultaneously with the closing of switch 16, which is held closed for the same length of time, connecting the battery across wires 12 and C.

Associated with each track relay and controlled by polarized contacts thereof is a relay $23^b$, $23^c$, $23^d$ etc., the function of which will be set forth hereinafter. Non-inductive resistances $39^b$, $39^c$, $39^d$ etc. are inserted in the connections to the common return conductor to limit the flow of current to the desired value, these resistances progressively decreasing with the distance from the central station, so as to effect a substantially equal flow of current at the several block stations.

The train equipment includes a pair of shoes 24 engaging the rails in advance of the foremost pair of wheels and axle; a polarized relay 25 connected to the shoes; a pair of slow release relays 26 and 27 controlled by 25; a clear lamp 28; a caution lamp 29; and a danger lamp 30.

Under clear track conditions, the track relays are constantly energized by continuous current reversing periodically in polarity, and the front contacts of the neutral contacts of these relays are continuously closed while the polarized contacts vibrate in synchronism with the reversals of polarity. Assuming shaft 19 to make one revolution every four seconds, battery 11 will be connected across wires 12 and C for a period of two seconds, during which current is transmitted to the track rails through the front neutral contacts of the track relays, the circuit being from wire 12, conductor 31, front contact 32, conductors 33 and 34, the lower rail, the track relay 10, the upper rail, conductors 35 and 36, front contact 37, conductor 38, resistance 39, to the common wire C. The direction of this current through the track relays is such as to cause the polarized contacts 40 to move to the right and engage their stationary contacts, thus closing pick-up circuits for relays 23, as will be obvious from the drawing. At the end of the two-second period in which the battery is connected across wires 12 and C by switch 15, switch 16 closes, thereby connecting the battery across the wires 13 and C. During the two-second period in which the battery is thus connected across wires 13 and C relays 23 are held up by current flowing through their front contacts. During this period current also flows through the front contacts of relays 23 through the rails and track relays, but in reverse direction with respect to the current flowing during the closure of switch 15 through the front contacts of the track relays. During this two-second period therefore track relays 10 will remain energized, but polarized contacts 40 will be in their left hand position. It will be understood therefore that under clear conditions there is a constant flow of current in the track rails, but reversing in polarity every two seconds.

Consider now the condition of the system with one of the blocks occupied. Assuming block D is occupied, relay $10^d$ is deenergized and its back neutral contacts are closed while its polarized contacts 40 occupy a central position, relay $23^d$ being accordingly deenergized. Wires 12 and C are still connected to the rails of block C, but the connections are reversed through the back contacts of relay $10^d$, wire 12 instead of being connected to the lower rail, as it is under clear conditions, being connected to the upper rail. Current therefore flows through the rails of block C for a period of two seconds every four seconds from wires 12 and C, current from wires 13 and C being cut off from this block at the front contacts of relay $23^d$. The direction of current through the rails of block C is such as to throw the polarized contacts 40 of relay $10^c$ to the left, and hence the pick-up circuit of relay $23^c$ will not be closed, and this relay cannot be energized under these conditions. During the two-second period in which current flows through relay $10^c$, current will flow from wires 12 and C through the front contacts thereof through the track rails of block B in a direction opposite to the flow of current through the track rails of block C. The direction of current flow in the rails of block B is such as to cause the polarized contacts 40 of relay $10^b$ to be held in their right hand position, closing the pick-up circuit for relay $23^b$, so that this relay will be energized during the two-second period in which current flows in the rails of block B from wires 12 and C, and will be held energized through its stick circuit during the two-second period in which current flows in wires 13 and C. Therefore current will be transmitted through the rails of block A from wires 12 and C through the front contacts of relay $10^b$ and from the wires 13 and C through the front contacts of relay $23^b$, the current in said rails alternating in polarity every two seconds, the normal condition of the block.

From the foregoing it will be understood that under normal conditions the track relays 10 and the stick relays 23 are constantly energized and current flows through the rails of the blocks continuously but with periodical reversals; and further that when a block is occupied current of one polarity flows in the rails of the block immediately in rear for a period of two seconds every four seconds, and current of the opposite polarity flows in the second block to the rear for a like period, and that normal conditions obtain in the third block to the rear.

Therefore, with block D occupied, the train represented in block A will have its relay 25 continuously energized with current alternating in polarity every two seconds. The polarized armature of this relay will vibrate under these conditions, closing circuit alternately through the slow-release magnets 26 and 27. So long as the circuits through these magnets do not remain open for a period exceeding two seconds, their front contacts will remain closed and the circuit of clear lamp 28 will be complete.

When the train in block A enters block B, with block D occupied, relay 25 will be energized intermittently, or for a period of two seconds every four seconds, the direction of current being such as to throw the polarized contact to the left and close the circuit of relay 26. Relay 26 will therefore continue to hold up its contacts but relay 27 will open its front contacts and close its back contacts a second or two after the entry of the train into block B. The clear lamp 28 will go out and the caution lamp 29 will light. If the train in block D should proceed and enter block C, with block D still occupied, relay 25 would be intermittently energized by current of opposite polarity from that received in block B. Hence relay 27 would pick up and remain picked up, while relay 26 would drop. Thus the caution lamp would go out and the danger lamp 30 would light. If the train in block C should enter block D before the latter were cleared, it would of course receive no current, and the back contacts of both relays 26 and 27 would be closed and the danger lamp 30 would go out. To indicate this condition a fourth lamp 42 may be provided in a circuit closed when both relays 26 and 27 are deenergized.

The system described above forms no part of the present invention, the invention being directed to the speed control permissive system illustrated in Fig. 2. This system permits the removal of the brake magnet from automatic control under danger conditions provided the engineer brings the speed of the train to a low value and performs a conscious manual act to insure his alertness to the situation. This permissive feature of the system permits the train to proceed into a danger zone and to maneuver therein at unrestricted speed and also permits the train to proceed into unsignaled territory at unrestricted speed. When a caution or clear signal, however, is received the brake controlling magnet is automatically placed under the control of the signaling system, thus insuring that the automatic train control is effective whenever the signals are displayed.

The clear and caution signals 28 and 29 are controlled by relays 26 and 27 in the same manner as in Fig. 1. The danger signal 30 is displayed whenever relay 26 remains deenergized, being controlled only by the back contact of this relay. Hence the danger signal will be displayed when the train occupies the block immediately in rear of an occupied block or when it is travelling in said occupied block. 43 is a pivoted arm movable by suitable speed responsive mechanism (not shown). 44 is a contact segment connected to the battery under clear conditions through the front contacts of relays 26 and 27; 45 is a shorter contact segment connected to the battery under caution conditions through the front contact of relay 26 and back contact of relay 27; and 46 is a still shorter contact which is connected to the battery under danger conditions through the back contact of relay 26. The brake controlling magnet 47 has one terminal connected to arm 43 and its other terminal connected to the battery. It will therefore be clear that magnet 47 will be energized under clear conditions at all speeds below a certain predetermined maximum through contact segment 44; that 47 will be energized under caution conditions at all speeds below a predetermined medium speed through contact segment 45; and that 47 will be energized under danger only when the train is standing still or travelling at a low speed.

In order to remove the brake controlling magnet 47 from these automatic restrictions, I provide among other mechanism a stick relay 48, and a control therefor including two contact segments 49 bridged by an insulated brush on arm 43 only when the train is standing still or travelling at a predetermined low speed. The pick-up circuit of relay 48 is as follows: the positive pole of the battery, conductor 50, contacts 49, conductor 51, normally open contacts of a push button 52, conductor 53, the winding of relay 48, a lamp 54, or other suitable signal, and to the negative pole of the battery by conductors 60 and 61. The holding circuit for relay 48 is as follows: positive pole of the battery, back contact 62 of relay 26, conductor 63, normally closed contacts of a push button 75, front contact 64, the winding of relay 48, the lamp 54 and back to battery by conductors 60 and 61. When relay 48 is energized it opens at back contact 65 the common return connection to the battery of the signal lamps 28, 29 and 30. When this relay is energized it also closes at front contact 66 a shunt for brake control magnet 47 around the automatically operated controlling contacts of this magnet, so that said magnet is energized independently of said contacts by the following circuit: negative pole of the battery, conductor 67, the winding of the magnet, conductor 68, front contact 66, conductors 69 and 70 and to the positive pole of the battery through a back contact of relay 26.

With this arrangement, in order that a train may enter a danger zone and maneuver therein without automatic restrictions, it is a condition precedent that the speed of the train be reduced to a low value and that the engineer show by the manual operation of push button 52 his awareness of the fact that his train is entering a danger zone, or is entering unsignaled territory, as the case may be. No block signals can be displayed while brake magnet 47 is thus removed from automatic control by speed, and hence the situation which might otherwise arise of proceeding under block signals with the automatic control suppressed can not arise. When caution or clear current is received, the stick circuit of relay 48 is broken at back contact 62 and thus brake magnet 47 is replaced under automatic control and the block signals rendered operative.

I claim:

1. In an automatic continuous indication train control system, clear, caution and danger signals, a brake controlling magnet deenergized if the train exceeds certain speeds when travelling under said clear, caution and danger signals, respectively, a stick relay having a pick-up circuit including a normally open manually operable switch and contacts closed only when the train is travelling below a predetermined low speed, a circuit for the brake magnet independent of the speed closed when said stick relay is energized, and a stick circuit for said relay opened upon the reception of clear or caution signaling current.

2. In a continuous indication train control system, a signal and a brake actuating magnet controlled by current continuously received from the track, means for deenergizing said magnet if the train exceeds a predetermined speed while said signal is displayed, a stick relay adapted when energized to hold said magnet energized independently of the speed, a pick-up circuit for said relay including in series a normally open manually operable switch and contacts closed only while the vehicle is standing still or travelling below a low speed, and a holding circuit for said relay opened upon the reception of signaling current from the track.

3. In a continuous indication train control system, a brake actuating magnet controlled by current received from the track and normally energized, means for deenergizing said magnet if the train exceeds predetermined speeds under caution and danger conditions, a stick relay adapted when energized to hold said magnet energized independently of the speed, a pick-up circuit for said relay including a series a normally open manually operable switch and contacts closed only while the vehicle is standing still or travelling at a low speed, and a holding circuit for said relay opened upon the reception of caution signaling current.

4. In a continuous indication train control system, a brake controlling magnet, means for transmitting to the vehicle from the track currents of two different characteristics, clear and caution signals displayed respectively upon the reception of said currents, means for deenergizing said magnet if the train exceeds a predetermined speed while the caution signal is displayed, a stick relay adapted when energized to hold said magnet energized independently of the speed, a pick-up circuit for said relay including in series a normally open manually operable switch and contacts opened whenever the vehicle exceeds a predetermined low speed, and a holding circuit for said relay opened upon the reception of current of either characteristic.

5. In a continuous indication train control system, means for transmitting to the vehicle currents of two different characteristics, clear and caution signals displayed respectively upon the reception of said currents, a normally energized brake controlling magnet, means for deenergizing said magnet if the vehicle exceeds a predetermined speed while the caution signal is displayed, a stick relay adapted when energized to hold said magnet energized independently of the speed and to prevent the display of said signals, a pick-up circuit for said relay including in series a normally open manually operable switch and contacts opened whenever the vehicle exceeds a predetermined low speed, a holding circuit for said relay including front contacts thereof and manual means for opening said holding circuit.

6. In a continuous indication train control system, a vehicle having a normally energized brake controlling magnet controlled by current from the track, means for deenergizing said magnet if the vehicle exceeds a predetermined speed under caution conditions, a stick relay adapted when energized to hold said magnet energized independently of the speed, a pick-up circuit for said relay including in series a normally open manually operable switch and contacts opened whenever the vehicle exceeds a predetermined low speed, manual means for opening said holding circuit, signals on the vehicle controlled by current from the track, and means to prevent the display of said signals when said stick relay is energized.

7. In a continuous indication train control system, a vehicle having a normally energized brake magnet, clear caution and danger signals on the vehicle, means for deenergizing said brake magnet when the vehicle exceeds predetermined speeds while the caution and danger signals are displayed, and manually controlled means initially operable only when the vehicle is travelling below a predetermined low speed for rendering said signals inoperative and holding said brake magnet energized independently of the speed.

8. In a continuous indication train control system, a vehicle having a normally energized brake magnet, a signal on the vehicle, means for deenergizing said brake magnet when the vehicle exceeds a predetermined speed while said signal is displayed, and manually controlled means initially operable only when the vehicle is travelling below a predetermined low speed for rendering said signal inoperative and holding said brake magnet energized independently of the speed.

In testimony whereof I hereunto affix my signature.

EDWARD C. SASNETT.